US012594574B2

(12) United States Patent
Morden et al.

(10) Patent No.: US 12,594,574 B2
(45) Date of Patent: Apr. 7, 2026

(54) ROTATIONAL APPLICATOR

(71) Applicant: The Boeing Company, Arlington, VA (US)

(72) Inventors: Sean Dennis Morden, Federal Way, WA (US); Richard Damien Freeman, Burien, WA (US)

(73) Assignee: THE BOEING COMPANY, Arlington, VA (US)

(*) Notice: Subject to any disclaimer, the term of this patent is extended or adjusted under 35 U.S.C. 154(b) by 127 days.

(21) Appl. No.: 18/358,351

(22) Filed: Jul. 25, 2023

(65) Prior Publication Data

US 2025/0033078 A1 Jan. 30, 2025

(51) Int. Cl.

*B05C 11/02* (2006.01)
*B05C 21/00* (2006.01)
*B05D 7/22* (2006.01)

(52) U.S. Cl.

CPC .......... *B05C 11/023* (2013.01); *B05C 21/005* (2013.01); *B05D 7/222* (2013.01)

(58) Field of Classification Search

USPC ......... 118/306, 317, 318, 323, 321, 55, 500; 427/230

See application file for complete search history.

(56) References Cited

U.S. PATENT DOCUMENTS

| | | | |
|---|---|---|---|
| 4,567,655 A | 2/1986 | Jacobs | |
| 5,448,814 A | 9/1995 | Fisher | |
| 5,534,060 A * | 7/1996 | Johnson | B05C 7/02 118/317 |
| 5,975,999 A | 11/1999 | Nitta | |
| 6,068,727 A | 5/2000 | Weaver et al. | |
| 2005/0145167 A1 | 7/2005 | Wilson | |
| 2021/0238867 A1 | 8/2021 | Stathis | |
| 2022/0388122 A1 | 12/2022 | Valentini | |

* cited by examiner

*Primary Examiner* — Yewebdar T Tadesse

(74) *Attorney, Agent, or Firm* — COATS & BENNETT, PLLC

(57) ABSTRACT

An applicator that includes a body with a first end, an opposing second end, and an intermediate flange. An arm is connected to and extends radially outward from the body. During use, viscous material is positioned on the surface of the workpiece outward away from an opening. The first end of the applicator is inserted into the opening and a bottom side of the flange contacts against the surface of the workpiece. The arm is positioned relative to the flange to be above the surface of the workpiece with a gap formed between the bottom side of the arm and the workpiece. The applicator is rotated causing the arm to move around the opening and spread the viscous material across the surface of the workpiece.

20 Claims, 6 Drawing Sheets

ROTATIONAL APPLICATOR

TECHNOLOGICAL FIELD

The present disclosure relates generally to the field of viscous material applicators and, more specifically, to an applicator configured to engage with an opening in a workpiece and is configured to rotate to spread the viscous material along the surface of the workpiece.

BACKGROUND

There are many manufacturing and assembly procedures that include applying a viscous material to a surface of a workpiece in proximity to an opening. FIG. 1 illustrates an example of a viscous material 110 that is applied to the surface of a workpiece 100 at an opening 101. The opening 101 can have different configurations, including but not limited to extending completely through the material (i.e., a through-opening) or extending a limited distance and having a bottom (i.e., a cavity).

During the application, the viscous material 110 should be applied in proximity to the opening 101 without being applied into the opening 101. One current method uses masks that extend over the opening 101 and are attached to the surface of the workpiece 100. However, masks are difficult to properly size as they may be too small and allow for adhesive to enter into the opening 101, or too large and prevent the adhesive from being applied in close proximity to the opening 101. Another issue with masks is the difficulty in securely attaching the masks to the surface such that the adhesive does not migrate underneath the mask and into the opening 101. If the mask is securely attached to prevent adhesive migration, it can be difficult to remove from the surface after application of the viscous material 110.

Another issue with existing processes is applying a consistent amount of viscous material 110 around the opening 101. Uneven application can result in voids without an adequate amount of viscous material 110 or an excess of viscous material that can make subsequent steps in the process difficult.

SUMMARY

One aspect is directed to an applicator to spread a viscous material around an opening in a workpiece. The applicator comprises: a body comprising a first end, a second end that opposes the first end, and a flange positioned between the first end and the second end; and an arm that is connected to and extends radially outward from the body with the arm comprising a bottom side, a top side, a front side wall and a back side wall that each extend between the bottom side and the top side, a first corner with a first radius that extends between the bottom side and the front side wall, and a second corner with a second radius that extends between the bottom side and the back side wall.

In another aspect, the flange comprises a bottom side configured to contact against the workpiece when the first end is inserted into the opening and wherein the bottom side of the arm is spaced upward from the bottom side of the flange along a centerline of the body.

In another aspect, a top side of the flange is aligned with the top side of the arm and both of the top side of the flange and the top side of the arm are flat.

In another aspect, the bottom side of the arm is flat.

In another aspect, the body comprises a cylindrical shape with a central opening that extends through the body from the first end to the second end.

In another aspect, the arm is a first arm and further comprising one or more additional arms that are connected to and extend radially outward from the body with the additional arms comprising a bottom side, a top side, a front side wall, and a back side wall.

In another aspect, the body comprises: a retainer at the first end; a core at the second end; and with the flange positioned between the retainer and the core and with the flange comprising a larger outer diameter than the retainer and the core.

In another aspect, one or more wings extends outward from the core between the flange and the second end with the one or more wings forming a handle and having a smaller length than the arm.

One aspect is directed to an applicator to spread a viscous material around an opening in a workpiece. The applicator comprises a retainer configured to be inserted into the opening; a core comprising one or more wings that form a handle; a flange positioned between the retainer and the core with the flange extending radially outward beyond the retainer and the core. The flange comprises a bottom side that faces towards the retainer and is configured to contact against the workpiece when the retainer is inserted into the opening. One or more arms extend radially outward from the flange with the one or more arms comprising a bottom side that faces towards the retainer. The bottom side of the one or more arms is spaced axially upward from the bottom side of the flange to be spaced away from the workpiece when the retainer is inserted into the opening and the bottom side of the flange contacts against the workpiece.

In another aspect, the one or more arms further comprise: a front side wall; a back side wall; a first corner with a first radius that extends between the bottom side and the front side wall; and a second corner with a second radius that extends between the bottom side and the back side wall.

In another aspect, the first radius and the second radius are equal.

In another aspect, one or more wings extend radially outward from the core and form a handle with the one or more wings having a length that is less than the one or more arms.

In another aspect, the retainer, the core, the flange, and the arm are solid and have a unitary one-piece construction.

In another aspect, a central opening extends through each of the flange, the core, and the retainer.

In another aspect, the bottom side of the one or more arms is flat.

One aspect is directed to a method of spreading a viscous material around an opening in a workpiece. The method comprises: inserting a first end of a body into the opening; contacting a bottom side of a flange on the body against a surface of the workpiece; spacing a bottom side of an arm that extends from the body above the surface of the workpiece; rotating the body and moving the arm around a centerline of the body; and contacting the viscous material with the arm and moving the viscous material into a gap formed between the bottom side of the arm and the surface of the workpiece.

In another aspect, the method further comprises contacting the viscous material against a flat side wall of the arm and then along a radiused corner of the arm and then into the gap.

In another aspect, the method further comprises contacting the bottom side of the flange that is flat against the surface of the workpiece and preventing the viscous material from migrating under the flange while rotating the body.

In another aspect, the method further comprises rotating the body in an opposing direction and spreading the viscous material and contacting the viscous material with an second side wall of the arm and into the gap formed between the bottom side of the arm and the surface of the workpiece.

In another aspect, the method further comprises spreading the viscous material in a circle around the opening.

The features, functions and advantages that have been discussed can be achieved independently in various aspects or may be combined in yet other aspects, further details of which can be seen with reference to the following description and the drawings.

DETAILED DESCRIPTION

Figure 1:
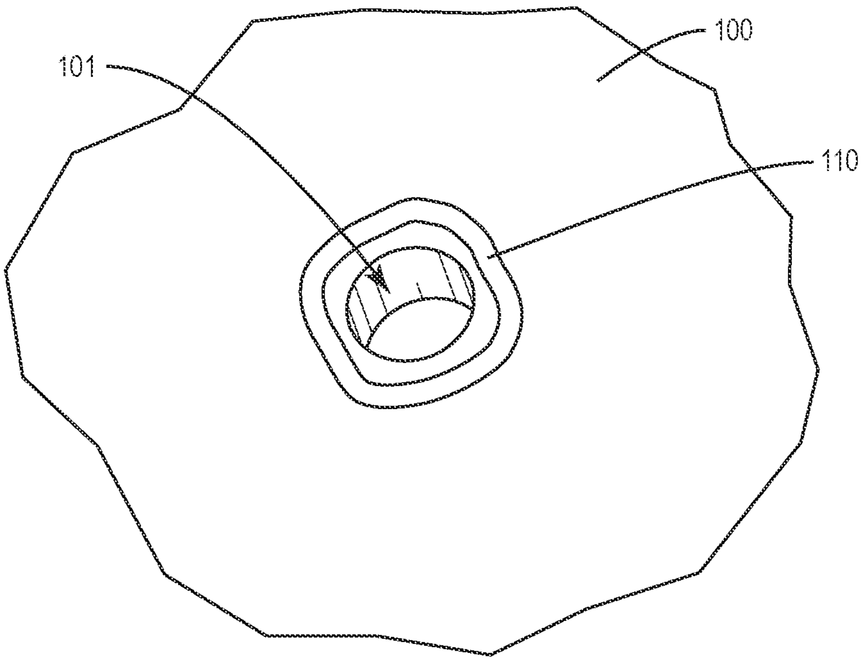
FIG. 1 PRIOR ART
FIG. 1 is a prior art perspective view of viscous material positioned around an opening in a workpiece.
Figure 2:
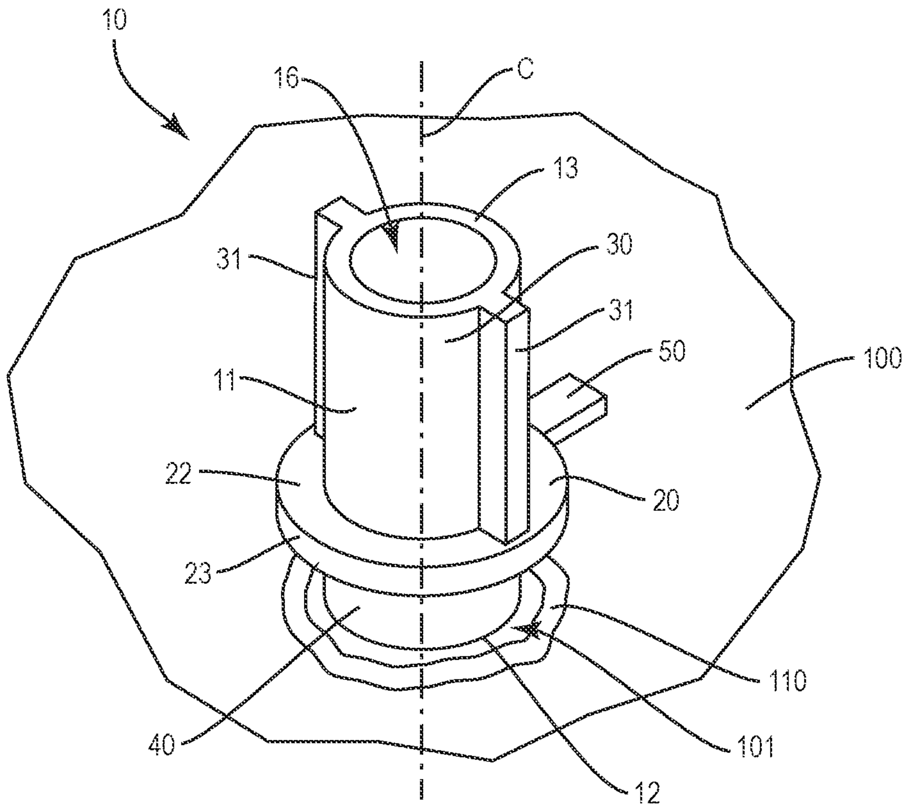
FIG. 2 is a top perspective view of an applicator.
Figure 3:
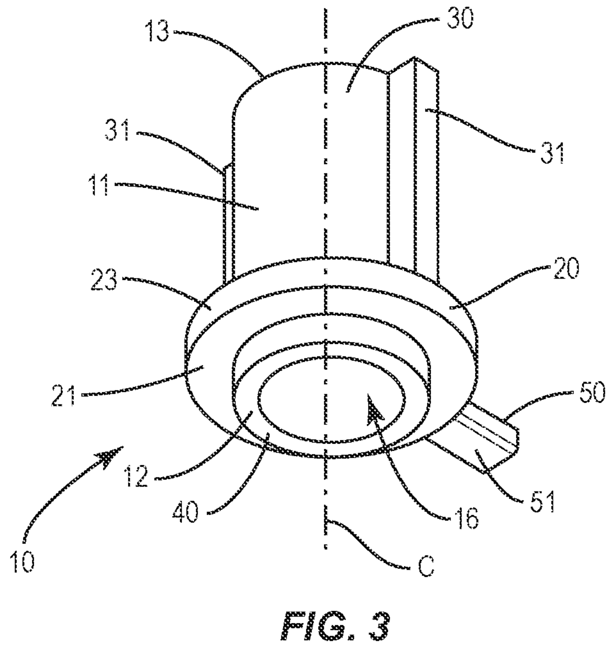
FIG. 3 is a bottom perspective view of the applicator of FIG. 2.

FIGS. 2 and 3 illustrate an applicator 10 configured to engage with an opening 101 in a workpiece 100 and spread a viscous material 110 around the opening 101. The applicator 10 includes a body 11 with a first end 12, an opposing second end 13, and an intermediate flange 20. An arm 50 is connected to and extends radially outward from the body 11. During use, viscous material 110 is positioned on the surface of the workpiece 100 outward away from the opening 101. The first end 12 of the applicator 10 is inserted into the opening 101 and a bottom side 21 of the flange 20 contacts against the surface of the workpiece 100. The arm 50 is positioned relative to the flange 20 to be above the surface of the workpiece 100 with a gap formed between the bottom side 51 of the arm 50 and the workpiece 100. The applicator 10 is rotated causing the arm 50 to move around the opening 101 and spread the viscous material 110 across the surface of the workpiece 100.

The applicator 10 can be used on a variety of different viscous materials 110. The viscous materials 110 are characterized by having a high resistance to flow. Examples include but are not limited to adhesives, lubricants, and caulks.

As more specifically shown in FIGS. 2 and 3, the applicator 10 includes a flange 20, a retainer 40 that extends outward from a first side of the flange 20, and a core 30 that extends outward from a first side of the flange 20. The arm 50 extends radially outward from the flange 20. In some examples, the applicator 10 has a unitary one-piece construction. In another example, the applicator 10 is constructed from multiple pieces that are joined together. The applicator 10 can be constructed from a variety of different materials including but not limited to plastics and metals.

In some examples, the body 11 has a cylindrical shape with a central opening 16. A centerline C extends through the central opening 16. Each of the flange 20, core 30, and retainer 40 are colinear and aligned along the centerline C. In some examples, the applicator 10 does not include a central opening 16 as one or more of the flange 20, core, 30, and retainer 40 are solid.

Figure 4:
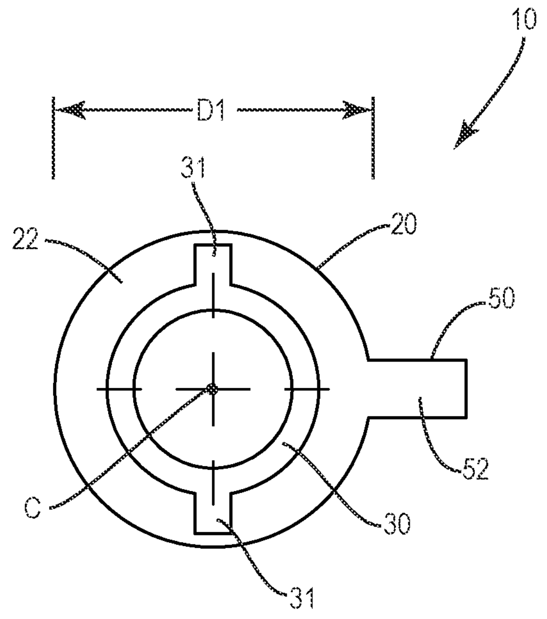
FIG. 4 is a top view of an applicator.
Figure 5:
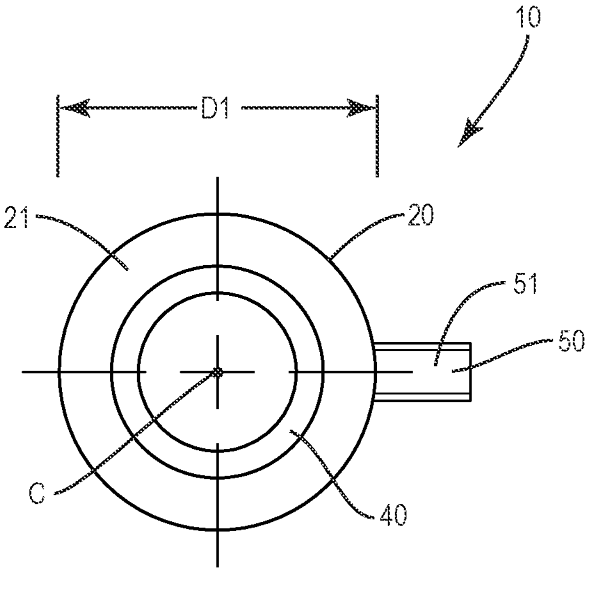
FIG. 5 is a bottom view of the applicator of FIG. 4.

The flange 20 includes a bottom side 21 and a top side 22. A side wall 23 extends between the bottom side 21 and the top side 22. The flange 20 can include a variety of different sectional shapes, including but not limited to circular, polygonal, and oval. In one example as illustrated in FIGS. 4 and 5 the flange 20 has a circular shape with an outer diameter D1. The outer diameter D1 is larger than the diameter of the opening 101 to control the extent of insertion into the opening 101. When fully inserted, the bottom side 21 contacts against the surface of the workpiece 100. The bottom side 21 is flat to maximize the contact between the flange 20 and the workpiece 100. The flat bottom side 21 also prevents the viscous material 110 from migrating underneath the flange 20 and potentially moving into the opening 101 in the workpiece 100.

Figure 9:
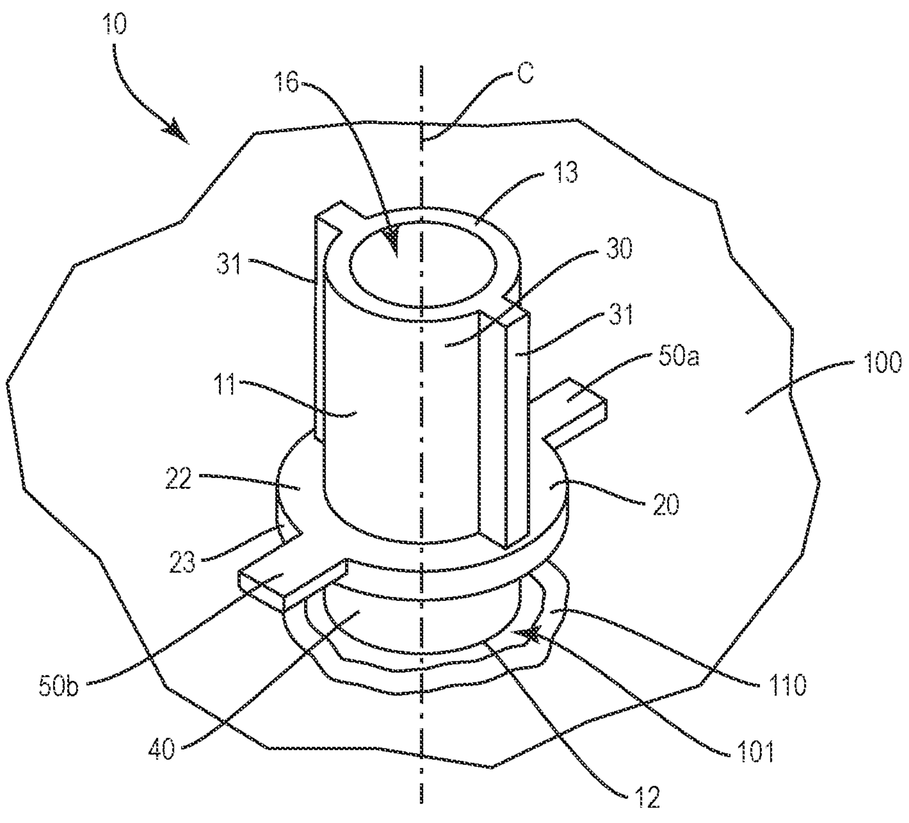
FIG. 9 is a top perspective view of an applicator.

One or more arms 50 extend radially outward from the body 11. In one example as illustrated in FIGS. 2 and 3, a single arm 50 extends outward from the side wall 23 of the flange 20. FIG. 9 illustrates an example with a pair of arms 50*a*, 50*b*. Other examples include more than two arms. In one example with multiple arms 50, the arms 50 are evenly distributed around the body 11. For example, an applicator 10 with two arms 50 are spaced around the perimeter of the body by 180° and an applicator 10 with three arms 50 are spaced apart by 120°). The one or more arms 50 extend radially outward from the body 11 with examples extending outward from the flange 20, the core 30, and retainer 40.

Figure 6:
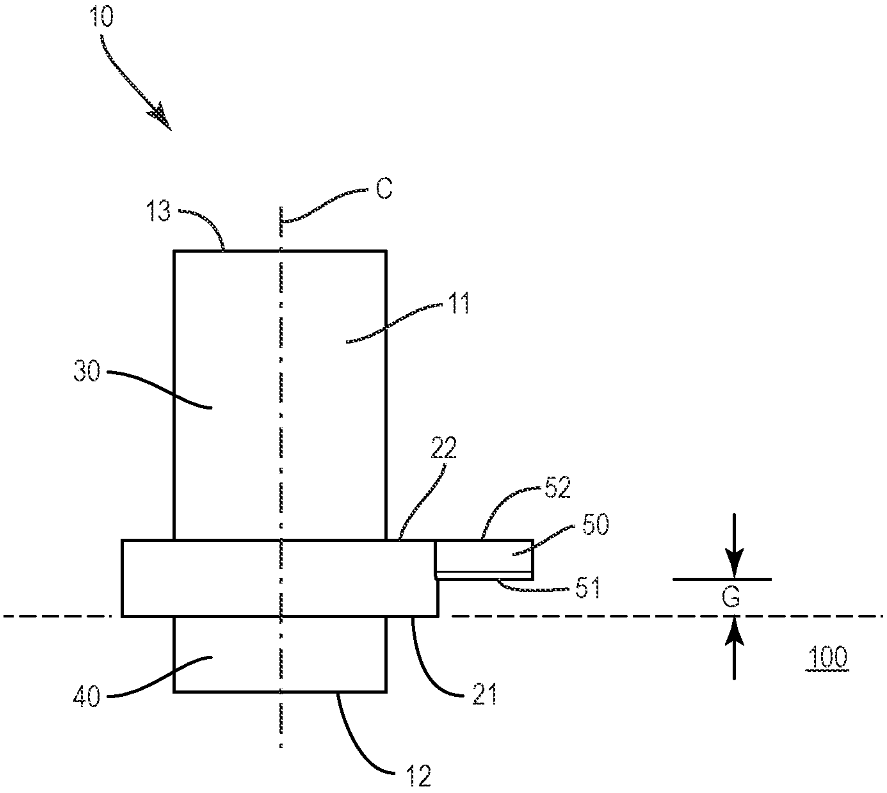
FIG. 6 is a side view of the applicator of FIGS. 4 and 5.

As illustrated in FIG. 6, the one or more arms 50 include a bottom side 51 and a top side 52. The bottom side 51 faces downward towards the workpiece 100 when the applicator 10 is inserted in the opening 101. As illustrated in FIG. 6, the bottom side 51 of the arm 50 is spaced upward from the bottom side 21 of the flange 20. A gap G is formed between the bottom side 21 and the surface of the workpiece 100 (shown in dashed lines in FIG. 6). This gap G provides space for spreading the viscous material 110.

Figure 7:
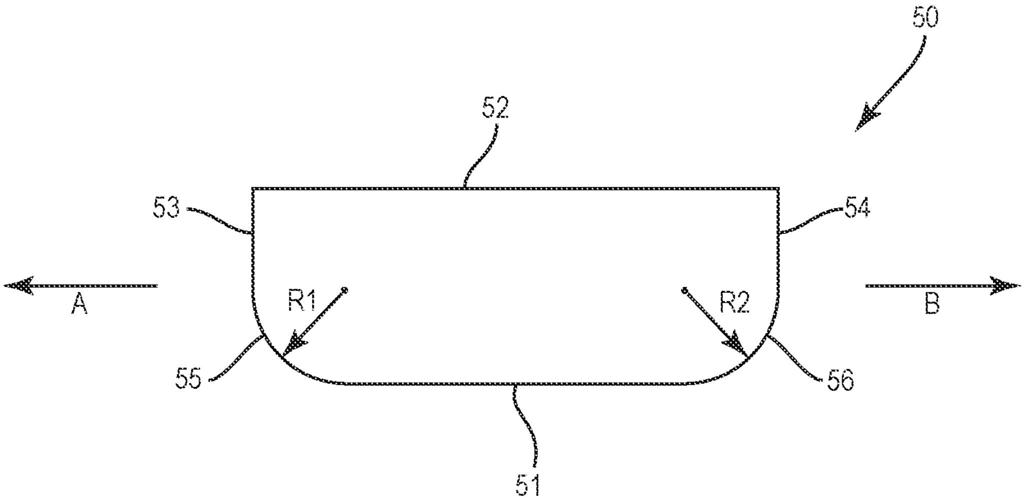
FIG. 7 is an end view of an arm of an applicator.

FIG. 7 illustrates an end view of an arm 50. The arm 50 includes a bottom side 51 and an opposing top side 52. Side walls 53, 54 extend between the bottom side 51 and the top side 52. A first corner 55 is formed between side wall 53 and the bottom side 51. A second corner 56 is formed between the side wall 54 and the bottom side 51. The corners 55, 56 are curved to facilitate distributing the viscous material 110 during rotation of the applicator 10. Corner 55 includes a first radius R1 and corner 56 includes a second radius R2. In some examples, the radii R1, R2 are the same. In other examples, the radii R1, R2 are different.

The radiused corners 55, 56 facilitate distributing the viscous material 110. When the applicator 10 is rotated in a first direction indicated by arrow A, the viscous material 110 contacts against the side wall 53. The radiused corner 55 provides for the viscous material 110 to move underneath the arm 50 and along the bottom side 51. Likewise when the applicator 10 is rotated in a second direction indicated by arrow B, the viscous material 110 contacts against the side wall 54. The radiused corner 56 facilitates movement of the viscous material 110 underneath the arm 50 and along the bottom side 51. The gap G formed between the bottom side 51 and the surface of the workpiece 100 provides for a uniform amount of the viscous material 110 to be deposited on the surface of the workpiece 100. In some examples, the bottom side 51 is flat providing for a uniform distribution of the viscous material.

FIG. 7 includes an example with the arm 50 having two radiused corners 55, 56. In another example, the arm 50 includes a single radiused corner. In another example, neither corner 55, 56 is radiused but rather include flat sides that meet at a right angle.

The core 30 extends axially upward from the flange 20. The core 30 is configured to be contacted by a user to apply a rotating force to the applicator 10. In some examples, the core 30 includes one or more wings 31 that extend radially outward from a central section. The wings 31 form a handle for grasping by a user. The wings 31 include a length that is less than the length of the arm 50.

Figure 8:
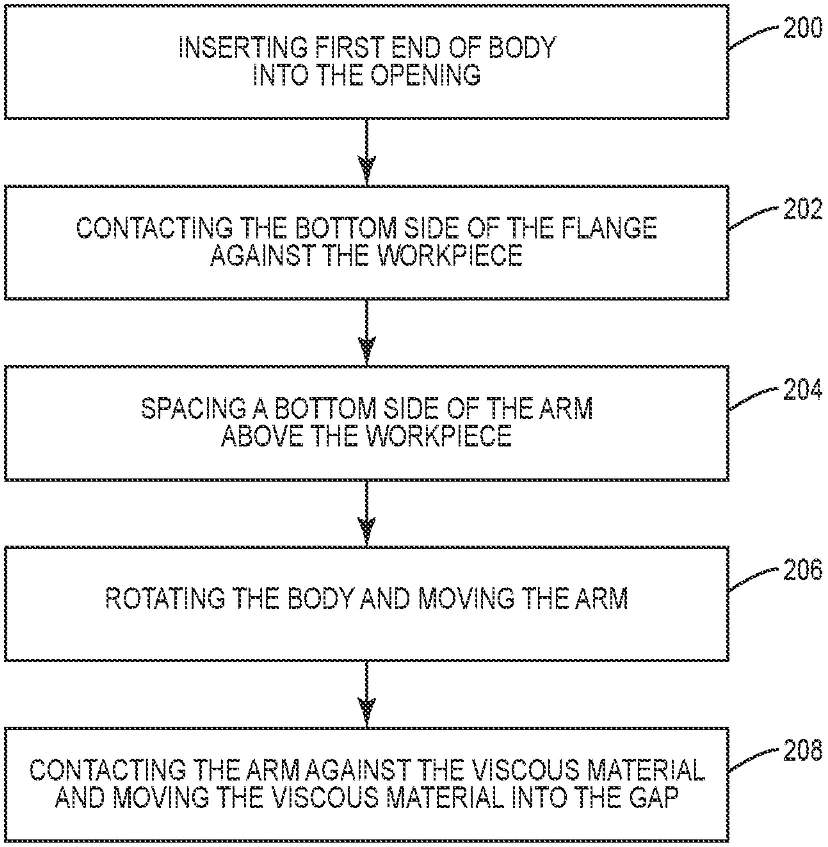
FIG. 8 is a flowchart diagram of a method of spreading a viscous material around an opening in a workpiece.

FIG. 8 illustrates a method of spreading a viscous material 110 around an opening 101 in a workpiece 100. The first end 12 of the body 11 is inserted into the opening 101 (block 200). The body 11 is inserted into the opening 101 until the bottom side 21 of the flange 20 contacts against the workpiece 100 (block 202). The flange 20 is larger than the opening 101 such that the flange 20 contacts against the surface and prevents further insertion of the body 11 into the opening 101. With the bottom side 21 of the flange 20 contacting against the workpiece 100, the bottom side 51 of the arm 50 is spaced above the surface of the workpiece 100 (block 204). The body 11 is rotated which moves the arm 50 around the opening 101 (block 206). The arm 50 contacts against the viscous material 110 that is on the surface of the workpiece 100 and moves the viscous material 110 into the gap formed between the bottom side 51 of the arm 50 and the surface of the workpiece 100 (block 208).

In some examples, the rotation of the body 11 and contact of the arm 50 evenly spreads the viscous material 110 along the surface of the workpiece 100 and around the opening 101. The flange 20 contacts against the surface of the workpiece 100 and prevents the viscous material 110 from migrating inward towards the opening 101 during rotation. This provides for the viscous material 110 to be evenly spread around the opening and a predetermined distance radially away from the opening 101.

In some examples, the viscous material 110 is placed on the workpiece 100 prior to inserting the applicator 10 into the opening 101. In other examples, the viscous material 110 is placed on the workpiece 100 after insertion.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An applicator to spread a viscous material around an opening in a workpiece, the applicator comprising:
- a cylindrical body comprising:
  - a first end that faces in a first direction;
  - a second end that opposes the first end and that faces in an opposing second direction;
  - a flange positioned between the first end and the second end;
  - wherein the first end and the second end comprise end surfaces that face apart and are exposed with the cylindrical body comprising a length measured between the first end and the second end;
- an arm that is connected to and extends radially outward from the cylindrical body along the length between the first end and the second end, the arm comprising:
  - a bottom side that is exposed and faces in the first direction;
  - a top side that is exposed and that faces in the second direction;
  - a front side wall and a back side wall that each extend between the bottom side and the top side;
  - a first corner with a first radius that extends between the bottom side and the front side wall; and
  - a second corner with a second radius that extends between the bottom side and the back side wall.

2. The applicator of claim 1, wherein the flange comprises a bottom side configured to contact against the workpiece when the first end is inserted into the opening, wherein the bottom side of the arm is spaced upward from the bottom side of the flange along a centerline C of the cylindrical body.

3. The applicator of claim 2, wherein a top side of the flange is aligned with the top side of the arm and both of the top side of the flange and the top side of the arm are flat.

4. The applicator of claim 1, wherein the bottom side of the arm is flat.

5. The applicator of claim 1, wherein the cylindrical body comprises a a central opening that extends through the body from the first end to the second end.

6. The applicator of claim 1, wherein the arm is a first arm and further comprising one or more additional arms that are connected to and extend radially outward from the cylindrical body, the additional arms comprise a bottom side, a top side, a front side wall and a back side wall that each extend between the bottom side and the top side.

7. The applicator of claim 1, wherein the body comprising:
- a retainer at the first end;
- a core at the second end;
- the flange positioned between the retainer and the core and with the flange comprising a larger outer diameter than the retainer and the core.

8. The applicator of claim 7, further comprising one or more wings extends outward from the core between the flange and the second end, the one or more wings forming a handle and having a smaller length than the arm.

9. A method of spreading a viscous material around an opening in a workpiece with the applicator of claim 1, the method comprising:
- inserting the first end of the cylindrical body into the opening;
- contacting a bottom side of the flange against a surface of the workpiece;
- spacing the bottom side of an arm that extends from the cylindrical body above the surface of the workpiece;
- rotating the cylindrical body and moving the arm around a centerline of the cylindrical body; and
- contacting the viscous material with the arm and moving the viscous material into a gap formed between the bottom side of the arm and the surface of the workpiece.

10. The method of claim 9, further comprising contacting the viscous material against the front side wall of the arm and then along the first corner of the arm and then into the gap.

11. The method of claim 9, further comprising contacting the bottom side of the flange that is flat against the surface of the workpiece and preventing the viscous material from migrating under the flange while rotating the cylindrical body.

12. The method of claim 9, further comprising rotating the cylindrical body in an opposing direction and spreading the viscous material and contacting the viscous material with the back side wall of the arm and into the gap formed between the bottom side of the arm and the surface of the workpiece.

13. The method of claim 9, further comprising spreading the viscous material in a circle around the opening.

14. An applicator to spread a viscous material around an opening in a workpiece, the applicator comprising:

a tubular body with a length that extends between a first end and a second end, the tubular body comprising:

a first section that extends inward at the first end, the first section forming a retainer configured to be inserted into the opening;

a second section that extends along the length and is positioned away from the first section, the second section forming a core comprising one or more wings that form a handle;

a flange positioned along the length of the tubular body between the retainer and the core, the flange extends radially outward beyond the retainer and the core, the flange comprising a bottom side that faces towards the retainer and is configured to contact against the workpiece when the retainer is inserted into the opening;

one or more arms that extend radially outward from the flange, the one or more arms comprising a bottom side that faces towards the retainer;

wherein the one or more arms comprise a smaller height than the flange with the height measured along the length of the tubular body;

wherein the bottom side of the one or more arms is spaced axially upward from the bottom side of the flange along the length to be spaced away from the workpiece when the retainer is inserted into the opening and the bottom side of the flange contacts against the workpiece.

15. The applicator of claim 14, wherein the one or more arms further comprises:

a front side wall;

a back side wall;

a first corner with a first radius that extends between the bottom side and the front side wall; and a second corner with a second radius that extends between the bottom side and the back side wall.

16. The applicator of claim 15, wherein the first radius and the second radius are equal.

17. The applicator of claim 14, further comprising one or more wings that extend radially outward from the core and form a handle, the one or more wings being spaced away from the retainer along the length.

18. The applicator of claim 14, wherein the retainer, the core, the flange, and the one or more arms are solid and have a unitary one-piece construction.

19. The applicator of claim 14, further comprising a central opening that extends through each of the flange, the core, and the retainer.

20. The applicator of claim 14, wherein the bottom side of the one or more arms is flat.

* * * * *